(12) United States Patent
Meyer et al.

(10) Patent No.: US 6,209,594 B1
(45) Date of Patent: *Apr. 3, 2001

(54) FILLING PIPE

(75) Inventors: Knut Meyer, Essen; Peter Andreas Löw, Erback, both of (DE)

(73) Assignee: Mannesmann VDO AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/370,495

(22) Filed: Aug. 9, 1999

(30) Foreign Application Priority Data

Aug. 10, 1998 (DE) .............................. 198 36 061

(51) Int. Cl.⁷ .............................. B65B 1/04; B65B 3/04; B67C 3/00
(52) U.S. Cl. .......................... 141/286; 141/285; 141/387; 141/391; 137/256; 137/264; 220/4.14; 220/86.2; 220/564
(58) Field of Search .............................. 141/18, 100–104, 141/234–237, 285, 286, 301, 302, 387, 391; 220/4.14, 86.1–86.3, 562–564, 905; 137/256, 262–264

(56) References Cited

U.S. PATENT DOCUMENTS

| 2,302,097 | * 11/1942 | Beckman ................................. 4/193 |
| 2,719,583 | * 10/1955 | Malick .................................. 158/46 |
| 4,441,533 | 4/1984 | Snyder et al. . |
| 4,765,359 | 8/1988 | Burnett . |
| 4,852,892 | * 8/1989 | Reid ..................................... 280/834 |
| 5,462,100 | 10/1995 | Covert et al. . |

FOREIGN PATENT DOCUMENTS

| 195 40 269 A1 | 4/1997 | (DE) .............................. B60K/15/04 |
| 0 832 777 A1 | 4/1998 | (EP) .............................. B60K/15/03 |
| 1 444 317 | 7/1976 | (GB) .............................. B67D/5/04 |

* cited by examiner

*Primary Examiner*—Timothy L. Maust
(74) *Attorney, Agent, or Firm*—David M. Thimmig; Mayer, Brown & Platt

(57) ABSTRACT

In the case of a filling pipe for a fuel tank a branching element is arranged in a section of the filling pipe. The flow of the inflowing fuel preferably runs along an outer wall of the filling pipe, so that a subflow is in each case conducted directly to the antisurge tower through a lower cross-sectional area. Larger volume flows, which completely fill the cross section, pass for the most part directly into the fuel tank. By this means, a sufficient basic supply of the antisurge tower is ensured irrespective of the volume flow produced during filling.

6 Claims, 2 Drawing Sheets

FILLING PIPE

BACKGROUND OF THE INVENTION

The invention relates to a filling pipe for filling a fuel tank, which has an antisurge tower, with fuel.

In addition to optimized space economy, the fuel tank of current motor vehicles at the same time has to offer the highest degree of passive safety. For this reason, the fuel tank is generally inserted into a region of the rear axle which is particularly well protected against mechanical damage. At the same time, fuel must not emerge under any driving conditions, in particular not even during overturning. In order to make possible convenient filling of the fuel tank despite this, the fuel tank is connected to a filling opening, which is arranged in the lateral rear region, by means of the filling pipe. The inflowing fuel passes through the filling pipe into the fuel tank and, at a sufficiently high level, into an antisurge tower inserted therein. In order to make it possible for the internal combustion engine to be sufficiently supplied, even under difficult driving conditions, the delivery unit does not suck up the fuel directly from the fuel tank but rather from the antisurge tower which surrounds the delivery unit. For this purpose, this antisurge tower is filled, by means of a pump, for example a sucking jet pump, continuously with fuel during operation, so that the antisurge tower is always sufficiently filled with fuel. As fuel consumption increases, the fuel tank, which surrounds the antisurge tower, is therefore emptied first of all and finally the antisurge tower itself is emptied.

A disadvantage here is that the fuel poured in after the fuel tank is completely emptied is initially unable to be sucked up by the delivery unit, since the fuel is first of all distributed in the fuel tank and the level remains so low that the required amount does not flow into the antisurge tower. Only relatively large amounts of fuel result in the antisurge tower being sufficiently supplied with fuel and thereby make the restoration of the operationally ready state possible. However, it is precisely during an emergency filling using a reserve can that the amount required for this purpose is, under some circumstances, insufficient.

It has also already been proposed to conduct the fuel flowing into the fuel tank through the filling pipe directly into antisurge tower, so that the latter is filled first of all and the overflowing fuel is subsequently distributed in the fuel tank. However, a disadvantage here is the fact that the overflowing of the antisurge tower causes a turbulent flow, with the result that the fuel tends to foam over and emit gases. At the same time, there is a delay in the length of time taken for filling the fuel tank, since in the meantime the process has to be interrupted and a delay made until the fuel has calmed down. However, during this time fuel vapors are able to escape unimpeded out of the fuel tank, which has to be avoided precisely in view of the health-endangering consequences of these fuel vapors. It has furthermore been shown in practice that large volume flows, which are conducted directly into the relatively small antisurge tower, are not suitable for reliable filling but rather that, in contrast, the greater part of the fuel is sprayed out or overflows and only a small part remains in the antisurge tower.

SUMMARY OF THE INVENTION

The invention is based on the problem of designing a filling pipe of the type mentioned at the beginning in such a manner that, on the one hand, filling of large volume flows is possible without increased emission of gases or foaming up, and, on the other hand, sufficient filling of the antisurge tower can be ensured even with relatively small amounts of fuel or small volume flows.

According to the invention, this problem is solved in that the filling pipe has a branching element which is designed to divert a first subflow of the fuel into the antisurge tower and a second subflow into the fuel tank. By this means, during each filling procedure both the fuel tank and the antisurge tower are filled directly. This, on the one hand, enables avoidance of the inflowing fuel, when there are relatively small amounts, being distributed in the fuel tank in such a manner that sucking is made difficult or impossible, and, on the other hand, the antisurge tower is only supplied with a small amount of the fuel directly, so that increased foaming up or emission of gases is prevented.

In this case, a development of the invention is particularly advantageous, in which the branching element is designed in such a manner that when there is a small inflowing volume flow, the greater part of the fuel can be fed to the antisurge tower. As a result, with small amounts of fuel and/or with small volume flows, as occur, for example, when filling using a reserve can, the antisurge tower is filled first of all. The operational readiness can thereby be restored again with very small amounts of fuel. When there are large volume flows, the inflowing fuel passes primarily into the fuel tank and therefore facilitates the filling. Therefore, in every case it is ensured that the antisurge tower is sufficiently supplied, it being insignificant, in particular, as to whether the inflowing volume flow of the filling amount is greater or lesser.

A development of the invention is particularly advantageous if the branching element has two cross-sectional areas, the ratio of size of which can be set. By this means, the subflow required for filling the antisurge tower can be adapted without any problem to different requirements. In this connection, it is both possible to undertake the setting of the two cross-sectional areas during the installation of the branching element and also to provide an adjusting mechanism which detects, for example, the parameters of level, volume flow etc. and brings about a corresponding adjustment of the branching element. This can take place mechanically by means of a corresponding actuator or by sensor using a control element.

A particularly advantageous embodiment of the invention is provided by the branching element having a separating plate. This enables a simple division of the inflowing volume flow, with the arising flow losses remaining relatively small. The subflows which are produced by the separating plate can be connected, for example, by means of a conduit in each case to the fuel tank, on the one hand, and on the other hand to the antisurge tower. The separation into two subflows, which is achieved by the separating plate, enables individual adaptation to different requirements by the two cross-sectional areas being set largely as desired.

A further, particularly advantageous embodiment of the invention is also provided by the branching element being formed by an opening in the wall of the filling pipe. By means of this opening, some of the inflowing fuel can be diverted and fed to the antisurge tower. For this purpose, this opening, which is designed, for example, as a slot, is arranged in a downwardly pointing section of the wall of the filling pipe, so that small volume flows can flow virtually completely through the opening. Large volume flows, which in particular fill the entire cross-sectional area of the filling pipe, flow away largely unhindered via the opening. The flow rate remains largely unchanged. At the same time, the installation outlay associated with the making of the opening is comparatively small, so that there is also the possibility of retrofitting existing systems without a problem.

A particularly simple embodiment of the invention can also be achieved by the branching element having an open duct. The fuel passes directly into the antisurge tower through this duct, the cross-sectional area of the duct being selected in such a manner that it can only hold a small volume flow. When there is a large volume flow, the fuel flows over the side walls of the duct and passes, for example, into a conduit which surrounds the duct and conducts the fuel into the fuel tank. The duct may also be arranged in such a manner that excess fuel drips freely downward into the fuel tank or runs downward along the inner wall of the fuel tank.

The branching element may be arranged in a section which runs obliquely or is inclined with respect to the vertical. However, an embodiment is particularly favorable in which the branching element is arranged in a horizontal section of the filling pipe. By this means, a simple and reliable separation of the inflowing fuel can be undertaken both in the case of large volume flows and in the case of small volume flows. In the process, small volume flows are largely conducted away downward and fed to the antisurge tower, while large volume flows can be fed largely unhindered to the fuel tank.

A particularly advantageous development of the invention is also provided if the branching element is arranged in a curved section of the filling pipe or in a directly adjacent section. Because of the curvature of the filling pipe, the flow of fuel preferably runs along the outward pointing section of the wall under the influence of centrifugal force or inertia. This effect occurs largely independently of the flow rate. In this region, a small amount of the fuel can therefore easily and completely be diverted, by means of the branching element, for the purpose of filling the antisurge tower, in particular even at a high flow rate. In the case of large volume flows, the cross-sectional area of the filling pipe is largely filled, so that the influence of centrifugal force is of merely secondary importance and the fuel can be supplied largely unhindered to the fuel tank.

BRIEF DESCRIPTION OF THE DRAWINGS

The invention permits various embodiments. To further clarify its basic principle two of these are represented in the drawing and they are described in the following. In the drawing.

DETAILED DESCRIPTION OF THE PREFERRED EMBODIMENTS

Figure 1:
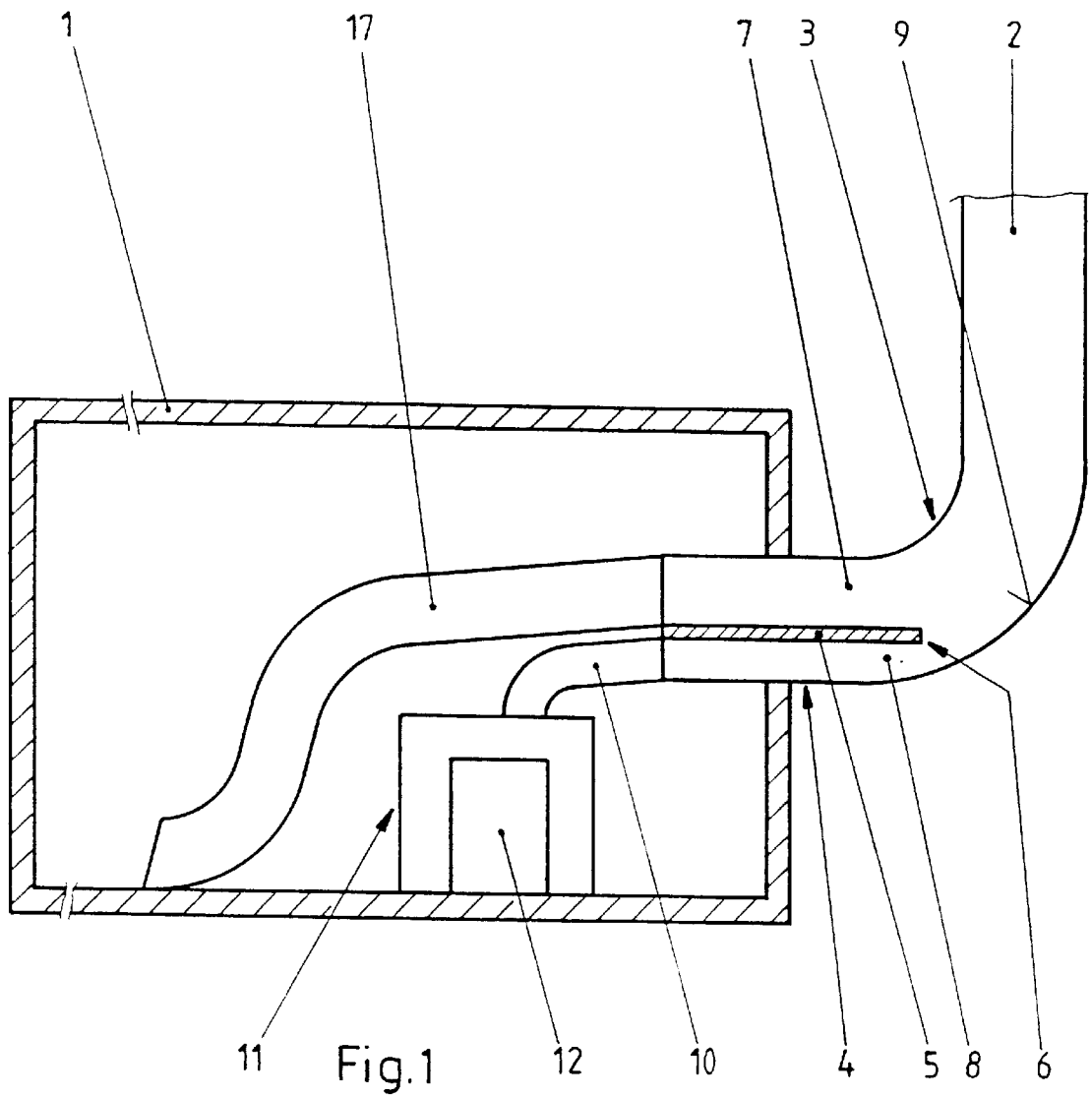
FIG. 1 shows a lateral, partially cut away representation of a filling pipe according to the invention together with a fuel tank.

FIG. 1 shows, in a schematic representation, a filling pipe 2, which is connected to a fuel tank 1, in a partially cut away side view. The filling pipe 2, only part of which is represented, has a curved section 3 in which the fuel flowing in perpendicularly from above into the filling pipe 2 is deflected into a horizontal section 4. The filling pipe 2 has a branching element 6 which is designed as a separating plate 5 and divides the filling pipe 2 into an upper cross-sectional area 7 for a subflow, which is guided into the fuel tank 1 by means of a conduit element 17, and a lower cross-sectional area 8 for a second subflow. For this purpose, part of the separating plate 5 projects into the curved section 3, so that the fuel, which clings against an outward pointing region of a wall 9 of the filling pipe 2 under the influence of centrifugal force, enters preferably, in particular with relatively small volume flows, into the lower cross-sectional area 8. At large volume flows both the lower cross-sectional area 8 and the upper cross-sectional area 7 of the filling pipe 2 are completely filled, so that in the embodiment represented, in accordance with the ratio of the upper cross-sectional area 7 to the lower cross-sectional area 8, the greater part of the fuel is fed directly to the fuel tank 1. In the process, in every case a sufficient amount of the fuel passes into the lower cross-sectional area 8 and, by means of a conduit element 10, to an antisurge tower 11, irrespective of the incoming volume flow of the fuel. A delivery unit 12, which is arranged in the antisurge tower 11, is therefore always sufficiently supplied with fuel, so that even in the event of emergency filling using a reserve can, the fuel supply is reliably restored. The fuel is therefore unable to be distributed into recesses of the fuel tank 1 which are unreachable for the delivery unit 12 without the antisurge tower 11 being sufficiently filled in this case beforehand.

Figure 2:
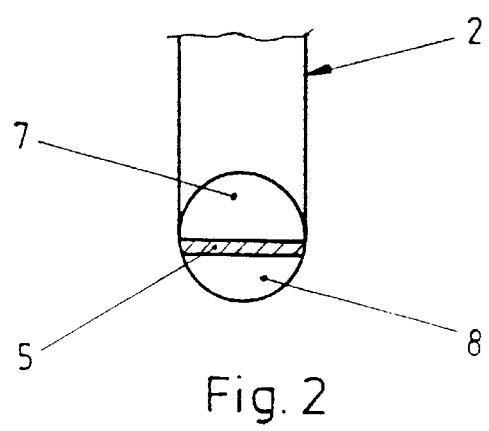
FIG. 2 shows the filling pipe shown in FIG. 1, in a front view.

FIG. 2 shows a front view, represented partially cut away, of the filling pipe 2. The separating plate 5, which divides the filling pipe 2 into the upper cross-sectional area 7 and the lower cross-sectional area 8, can be seen. In this case, the lower cross-sectional area 8 is selected to be smaller than the upper cross-sectional area 7, an optimum ratio of the particular distances of the separating plate 5 to the upper edge and to the lower edge being approximately 2:1.

Figure 3:
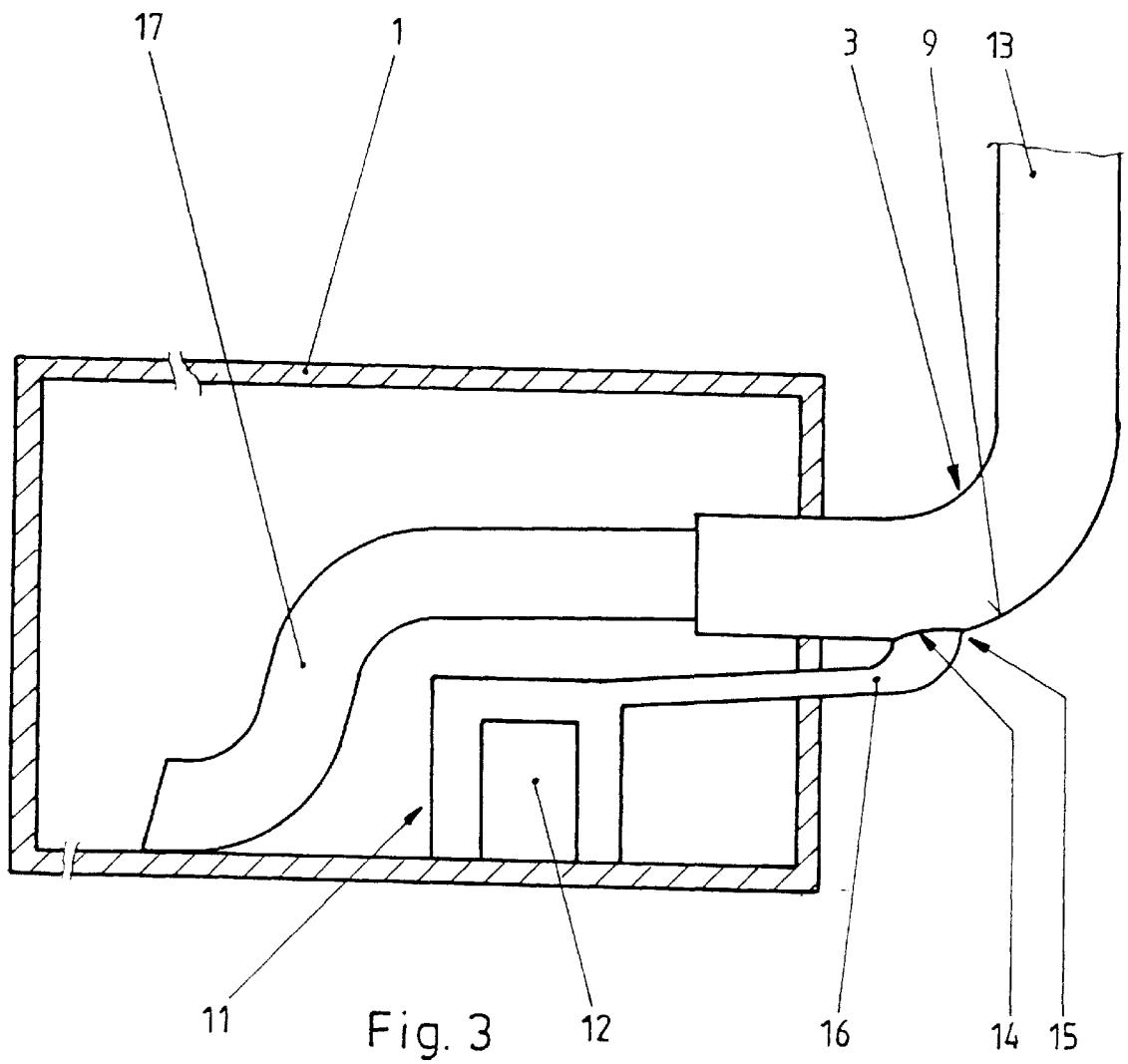
FIG. 3 shows a lateral, partially cut away representation of a further embodiment of a filling pipe.

FIG. 3 shows an embodiment of a filling pipe 13, which embodiment is modified with respect to the filling pipe represented in FIG. 1, in a partially cutaway side view. In this case, the filling pipe 13 in its curved section 3 has a branching element 15 which is provided with an opening 14 through which a subflow of the fuel entering into the filling pipe 13 is diverted and, by means of a conduit element 16, is fed directly to the antisurge tower 11. In the case of small volume flows of the fuel, the fuel runs essentially along the outward pointing region of the wall 9 of the curved section 3, so that the greater part of the fuel passes through the opening 14. Larger volume flows pass unhindered through the curved section 3 and are therefore predominantly fed to the fuel tank 1 by means of the conduit element 17. Because of the design of the branching element 15 with the opening 14, the cross section of the filling pipe 13 remains unchanged, with the result that there is no disadvantageous delay or swirling of the flow and an associated vigorous foaming up of the fuel or emission gases from the fuel.

Figure 4:
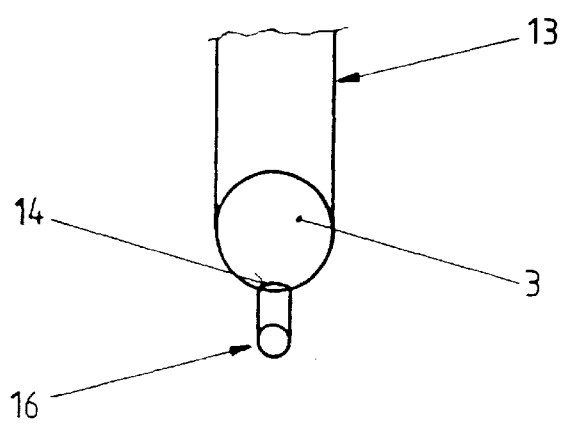
FIG. 4 shows the filling pipe shown in FIG. 3, in a front view.

FIG. 4 shows the filling pipe 13 represented in FIG. 3, in a front view. The opening 14, which is arranged in the curved section 3 and through which a subflow of the fuel passes into the conduit element 16, can be seen.

What is claimed is:

1. A filling pipe for filling a fuel tank, which has an antisurge tower, wherein the filling pipe has a branching element comprising a separating plate which is designed to divert a first subflow of fuel into the antisurge tower and a second subflow into the fuel tank, and wherein the branching element is designed in such a manner that when there is a small inflowing volume flow, the greater part of the fuel can be fed to the antisurge tower.

2. The filling pipe as claimed in claim 1, wherein the branching element has two cross-sectional areas, the ratio of size of which can be set.

3. The filling pipe as claimed in claim 1, wherein the branching element is arranged in a horizontal section of the filling pipe.

4. The filling pipe as claimed in claim 2, wherein the branching element is arranged in a horizontal section of the filling pipe.

5. The filling pipe as claimed in claim 1, wherein the branching element is arranged in a curved section of the filling pipe or in a directly adjacent section.

6. The filling pipe as claimed in claim 2, wherein the branching element is arranged in a curved section of the filling pipe or in a directly adjacent section.

* * * * *